US006682768B2

(12) United States Patent
Moca et al.

(10) Patent No.: US 6,682,768 B2
(45) Date of Patent: Jan. 27, 2004

(54) BUTTER FLAVORED FLAKES

(75) Inventors: Judith Gulten Moca, Laurel, MD (US); Thomas James Dezarn, Ellicott City, MD (US)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/841,510

(22) Filed: Apr. 24, 2001

(65) Prior Publication Data

US 2002/0176924 A1 Nov. 28, 2002

Related U.S. Application Data

(60) Provisional application No. 60/199,398, filed on Apr. 25, 2001.

(51) Int. Cl.[7] .................................................. A23D 9/00
(52) U.S. Cl. ....................... 426/607; 426/115; 426/650; 426/613
(58) Field of Search ................................ 426/601, 607, 426/94, 96, 99, 98, 606, 653, 112, 115, 650, 613; D1/123

(56) References Cited

U.S. PATENT DOCUMENTS

| D193,542 | S | * | 9/1962 | Gordon | D1/123 |
|---|---|---|---|---|---|
| D193,543 | S | * | 9/1962 | Gordon | D1/112 |
| D195,498 | S | * | 6/1963 | Gordon | D1/123 |
| D208,756 | S | * | 10/1967 | Reinhart | D1/123 |
| D210,991 | S | * | 5/1968 | Oelke | D1/123 |
| D215,077 | S | * | 9/1969 | Harwood | D1/123 |
| D219,003 | S | * | 10/1970 | Harwood | D1/123 |
| D219,801 | S | * | 2/1971 | Harwood | D1/123 |
| D221,723 | S | * | 9/1971 | Topalis | D1/123 |
| D222,223 | S | * | 10/1971 | Topalis | D1/123 |
| 4,469,710 | A | | 9/1984 | Rielley et al. | |
| 4,891,233 | A | | 1/1990 | Belanger et al. | |
| 5,354,572 | A | * | 10/1994 | Miller et al. | 426/580 |
| 5,356,643 | A | * | 10/1994 | Miller et al. | 426/140 |
| 5,431,945 | A | * | 7/1995 | Miller et al. | 426/580 |
| 5,447,735 | A | * | 9/1995 | Miller | 426/285 |
| 5,532,020 | A | | 7/1996 | Silver | |
| 5,770,254 | A | | 6/1998 | Izzo et al. | |
| 5,895,675 | A | * | 4/1999 | Carment et al. | 426/99 |
| 6,139,887 | A | * | 10/2000 | Carment et al. | 426/99 |
| 6,312,751 | B1 | * | 11/2001 | Cain et al. | 426/607 |
| 6,312,752 | B1 | * | 11/2001 | Lansbergen et al. | 426/549 |
| D452,360 | S | * | 12/2001 | Teras | D1/123 |
| 6,340,491 | B1 | * | 1/2002 | Cain et al. | 426/554 |
| 6,406,737 | B1 | * | 6/2002 | Cain et al. | 426/601 |

FOREIGN PATENT DOCUMENTS

| EP | 1101410 | * | 10/2000 |
|---|---|---|---|
| GB | 2176143 | * | 12/1986 |

* cited by examiner

*Primary Examiner*—Carolyn Paden
(74) *Attorney, Agent, or Firm*—Edward A. Squillante, Jr.

(57) ABSTRACT

An edible particle composition with fat, flavor and an $N_{20}$ of $\geq 20$ is described. The edible particle composition may have butter flavor and can be mixed with a variety of spices, even in the absence of water. The edible particle composition does not require refrigeration and may be applied to food without a kitchen utensil.

19 Claims, 4 Drawing Sheets

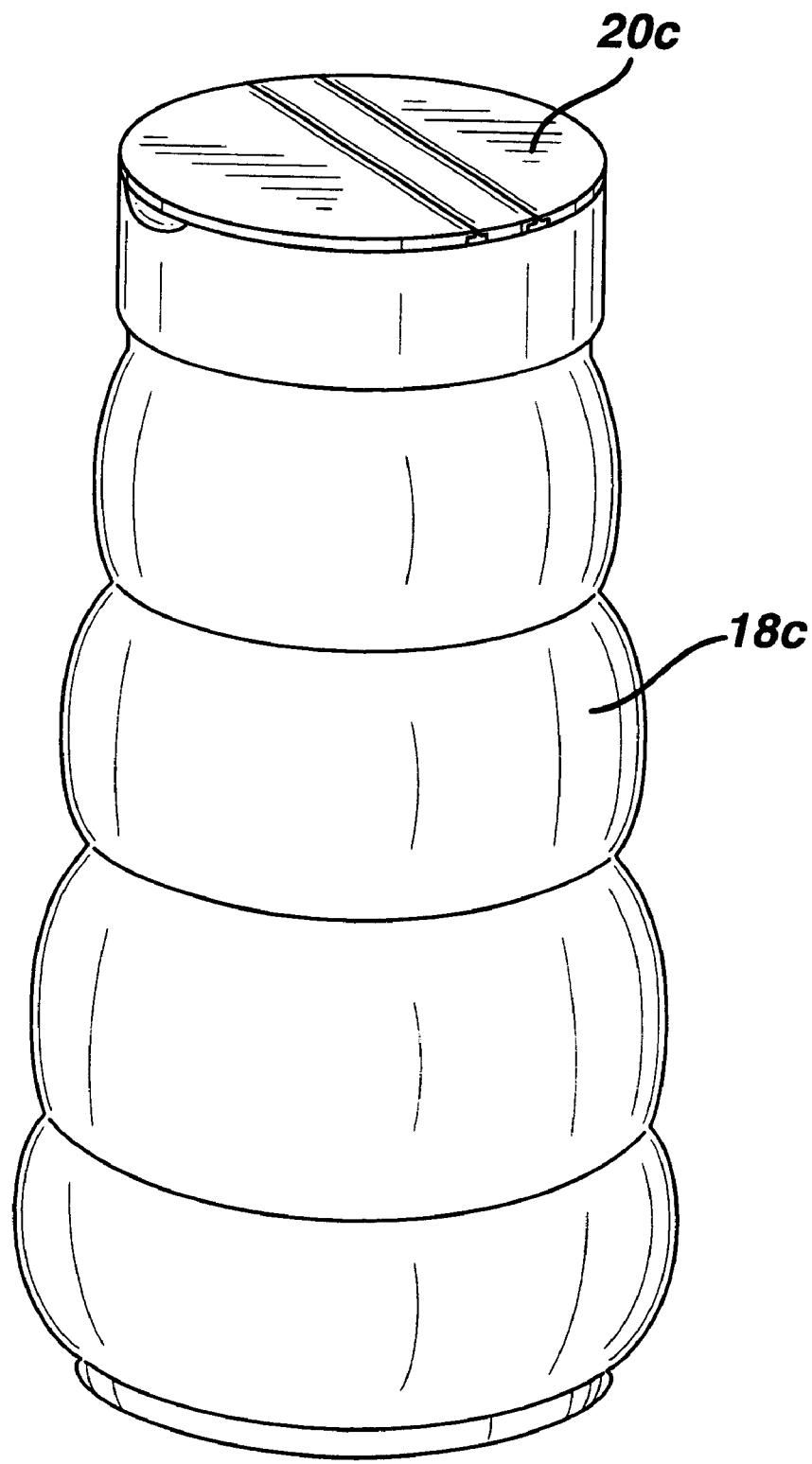

BUTTER FLAVORED FLAKES

This application claims priority to U.S. Provisional Application No. 60/199,398, filed on Apr. 25, 2001, which is now abandoned.

FIELD OF THE INVENTION

This invention is directed to edible particles. More particularly, the invention is directed to edible particles that comprise flavor such as butter flavor.

BACKGROUND OF THE INVENTION

Many consumers enjoy the taste of commercial spreads (e.g., Promise Margarine and I Can't Believe Its Not Butter) on the foods they eat. These spreads may be used, for instance, on breads and vegetables as well as on foods that are being baked, grilled, fried or broiled.

Often it is desired to have, on foods, the taste provided by spreads without the need of a spread. This invention is directed to edible particles that melt well and that comprise flavors that are typically found in spreads. The edible particles of this invention do not require refrigeration and may be applied to food products without using a kitchen utensil such as a knife.

Moreover, the superior edible particles of the present invention may also be used for a variety of cooking uses, including grilling, sauteeing and stir-frying. When cooking with the edible particles of this invention, the edible particles create an aroma and a foam-like appearance similar to the aroma and appearance generated by butter during cooking applications. The food products, having been cooked with the edible particles of this invention, unexpectedly display a golden-brown appearance similar to the appearance of foods having been cooked with butter.

BACKGROUND MATERIAL

Efforts have been made to prepare spread compositions. In U.S. Pat. No. 5,770,254, a reduced fat composition and methods for preparing and using the same are described.

Still other attempts have been made to prepare spread compositions. In U.S. Pat. No. 5,532,020, low calorie table-spreads made from liquid triglycerides oil are described.

Even further, attempts have been made to prepare flakes of baking shortening or lard. In U.S. Pat. No. 4,891,233, flakes for making pie crust dough are described.

In U.S. Pat. No. 4,469,710, efforts for making a pourable solid composition are disclosed wherein the solid composition resists agglomeration up to 110° F.

SUMMARY OF THE INVENTION

In a first aspect, this invention is directed to an edible particle composition comprising:

(a) fat;
(b) a taste enhancing agent;
(c) flavor; and
(d) with or without a flow enhancing agent.

Optionally, the edible particle composition of this invention may comprise up to 20.0% by weight water, but preferably, has substantially no water. Most preferably, the edible particle composition is made from a precursor that comprises no water.

In a second aspect, this invention is directed to the edible particle composition of the first aspect of this invention in a package, the package being paper or polymer based and equipped with holes to shake the edible particle composition out or a hole to pour the edible particle composition out.

In a third aspect, is invention is directed to a process for making the edible particles of the first aspect of this invention.

As used herein, edible particle and edible particle composition may be used interchangeably.

BRIEF DESCRIPTION OF THE DRAWINGS

The subject matter which is regarded as the invention is particularly pointed out and distinctly claimed in the concluding portion of the specification. The invention may, however, be further understood by reference to the following description taken in conjunction with the accompanying drawing figures in which:

FIGS. 3a to 3c show containers (or packaging) for dispensing the edible particles of this invention.

DETAILED DESCRIPTION OF THE PREFERRED EMBODIMENTS

Figure 1:
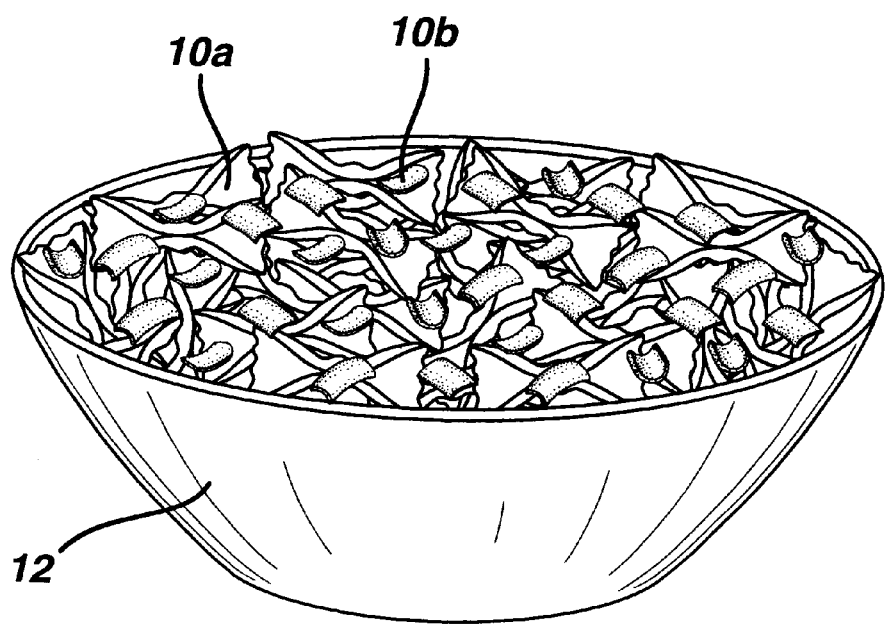
FIG. 1 shows the edible particles of this invention on a bowl of pasta.

The only limitation with respect to the fat which may be used in this invention is that the fat is edible and has an $N_{20}$ of $\geq 20$, and preferably, $\geq 50$, and most preferably $\geq 70$.

The fat which may be used in this invention may come from a variety of sources as long as the fat that is edible. Such a fat includes oils comprising triglycerides, fatty acids, fatty alcohols, and esters of such acids and alcohols. These fats more specifically include:

(1) vegetable fats and oils, such as soya bean, olive, corn, safflower, sunflower, cotton seed, canola, rape seed, sesame seed, nasturtium seed, tiger seed, rice branch, wall flower and mustard seed;

(2) meat fats, such as tallow or lard;

(3) marine oils, such as menhaden, pilchard, sardine, whale or herring;

(4) nut fats and oils, such as coconut, palm, palm kernel, babbas kernel or peanut;

(5) milk fats, such as butter fat;

(6) cocoa butter and cocoa butter substitutes, such as shea, or illipe butter;

(7) synthetic fats; and (8) mixtures thereof.

In a preferred embodiment, however, the fat which is used in this invention is a mixture of vegetable oils like partially hydrogenated cotton seed oil and partially hydrogenated soybean oil. Such a fat is made commercially available from suppliers like Loders Croklaan and sold under the names of, for example, CLSP870, Kaomel, and Kaorich.

Typically, when preparing the edible particle composition of the present invention, from about 50% to about 95% by weight of fat is used, based on total weight of the edible particle composition. Preferably, however, at least about 75% by weight of the edible particle composition of this invention is fat.

The taste enhancing agents which may be used in this invention include sodium chloride, monosodium glutamate, spices (e.g., cinnamon and other commercially available spices), and mixtures thereof. There generally is no limitation with respect to the amount of taste enhancing agent employed; however, from about 0.2% to about 22.5% by weight taste enhancing agent (based on total weight of the edible particle composition) is generally employed.

As to the flavors which may be used in this invention, such flavors include commercially available natural or artificial flavors including flavors which may be classified as butter, lemon, garlic, onion, fruit, or vegetable flavors. Other flavors which may be used in this invention include cheese, sesame, pesto, pepper and garden herb flavors. Such flavors typically make up from about 0.0008% to about 15.0% by weight of the total weight of the edible particle composition. In a preferred embodiment, however, the edible particle composition of this invention preferably has butter flavor.

As to the other commercially available spices which may be used in this invention, these include parsley, oregano, basil, chili powder, taco seasoning, paprika, italian seasoning, ginger, nutmeg, thyme, cumin, rosemary, dill, mustard, sage, curry or a mixture thereof.

It is also noted herein that it is within the scope of this invention to add up to 20.0% by weight water to the edible particle composition of the present invention, based on total weight of the edible particle composition. Moreover, it is within the scope of this invention to add flow enhancing agents to the edible particle composition. Such flow enhancing agents include agents such as tricalcium phosphate or maltodextrin or both and they are typically used in amounts from about 0.5% to about 9.0% by weight, based on the total weight of the edible particle composition.

Other ingredients which may be used in this invention include colorants and vitamins, like vitamin purple (mixture of beta-carotene and vitamin A); emulsifiers like lecithin, Myverol 1804, and Santone; fillers like maltodextrin. Such additives (collectively) typically make up from about 2.5% to about 7.5% by weight of the total weight of the edible particle composition.

The shape of the edible particle of this invention is limited only to the extent that the resulting product may be poured or shaken out of a dispenser which may be held in the hand. Preferably, the edible particles of this invention are pellet-like, needle-like, hair-like, flake-like or bead-like. More preferably, the edible particles of this invention are in the form of flakes. Flakes (or flake-like), as used herein, are defined to mean shavings similar in appearance to shavings that have been planed off of a block of wood. Most preferably, the edible particles of this invention comprise both a convex and a concave portion.

Figure 2:
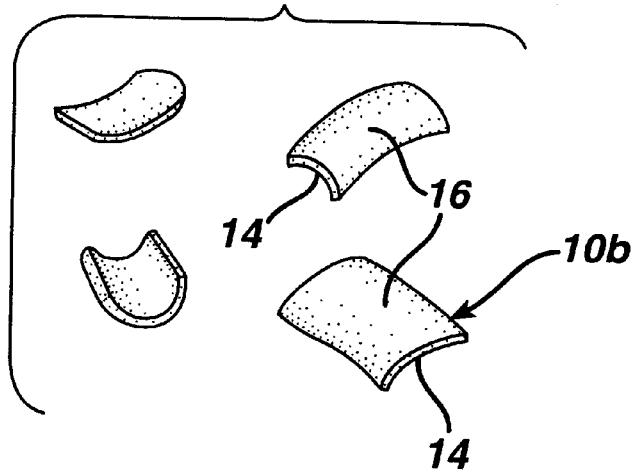
FIG. 2 shows the convex and concave characteristics of the edible particles of this invention.
Figure 3A:
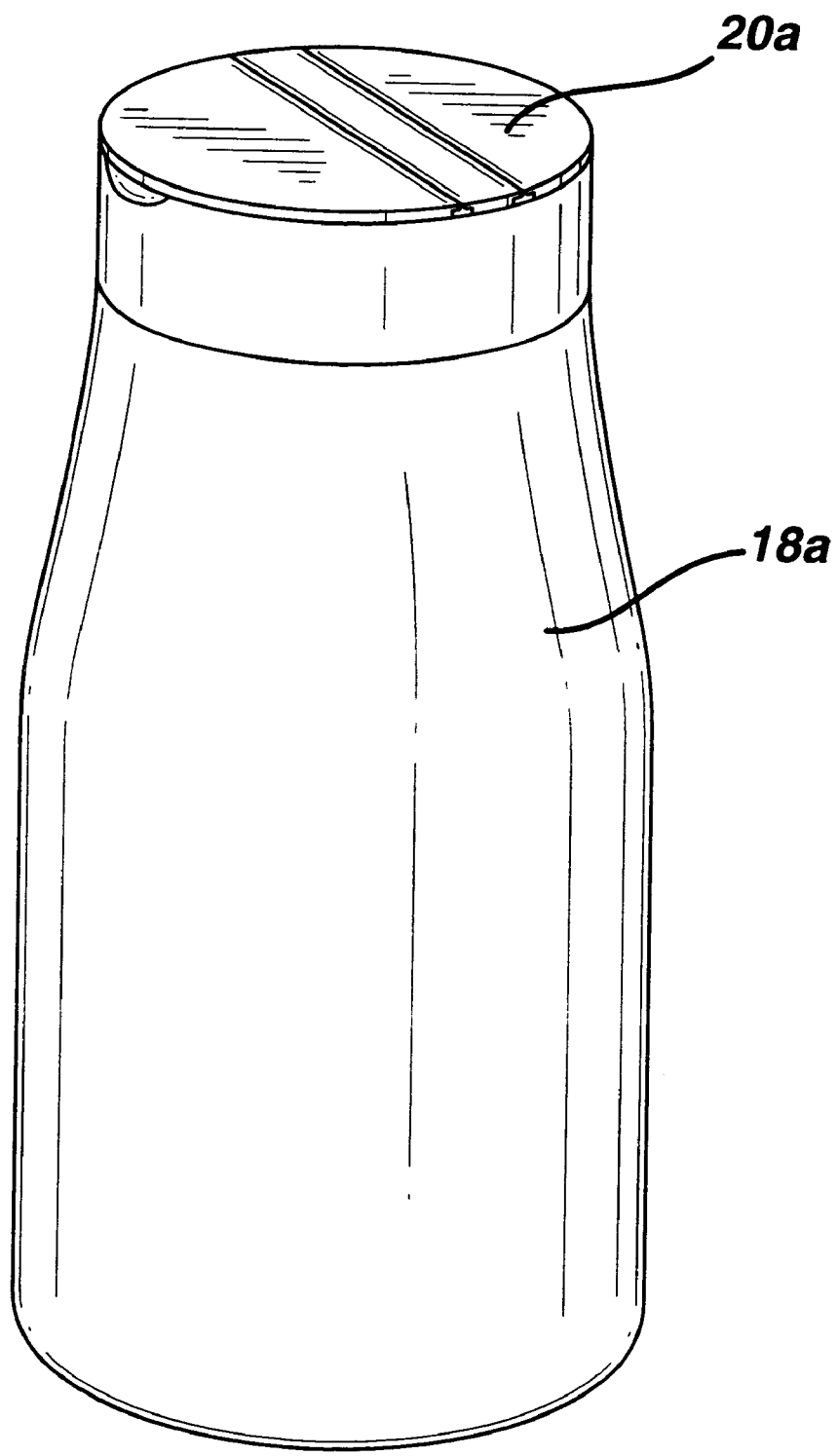
Figure 3B:
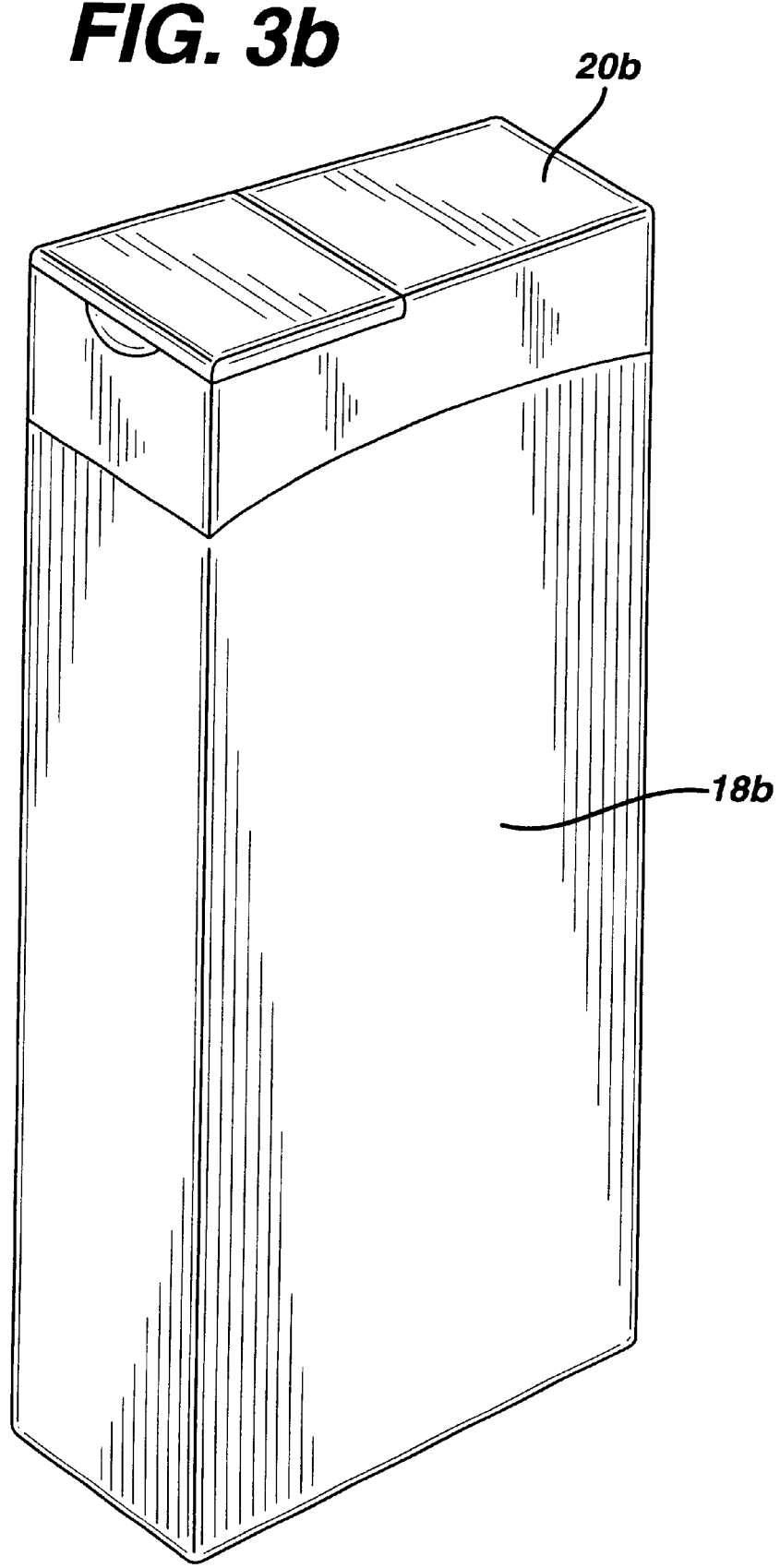

Turning to the Figures, FIG. 1 depicts pasta 10a in a bowl 12 having edible particles 10b as described in the present invention sprinkled thereon. FIG. 2 shows that each particle 10b has a substantially concave portion 14 and a substantially convex portion 16. FIGS. 3a–3c show containers 18a–18c (e.g., packages) having opening sections 20a–20c. The opening sections 20a–20c allow for the edible particle 10b to be dispensed or poured onto food (not shown). Containers 18a and 18c are preferably made of polymeric material (plastic) and container 18b is preferably made of paper or cardboard.

When preparing the edible particles of the present invention, the base ingredients (e.g., emulsifiers, salt, maltodextrin, flavor, vitamin) may be added to melted fat (about 60° C.) and blended. The resulting mixture is pumped through a Scraped Surface Heat Exchanger to be cooled (about 30° C.) and pin mixers to be crystallized and homogenized. Controlled cooling allows obtaining a controlled network of fat crystals that will benefit the product texture, making it more suitable for shredding and obtaining the desired particle appearance. The resulting crystallized plastic fat may then be packed at 90° F. and stored at 50° F. After storage, the completely solid material may then be passed through a commercially available plane-type shredding device to produce edible particles (curl-like shreds or flakes) 10b. The edible particles can then be mixed with anticaking agents in a tumble mixer. The resulting edible particles having been mixed with anticaking agent can then be sent to a packaging machine for filling into packages.

It is noted herein that in lieu of the plane-type shredding device, a pellet device may be used to produce edible particles that are pellet-like instead of edible curl-like shreds or flake particles.

The following examples are provided in order to facilitate an understanding of the present invention. The formulae described in the examples were processed in the manner described above with the plane-type shredding device.

EXAMPLE 1

|  | Butter flavored variant % |
|---|---|
| Kaomel (partially hydrogenated vegetable oil) | 71.9665 |
| Kaorich (partially hydrogenated vegetable oil) | 4.9505 |
| Standard Lecithin | 1.9802 |
| Centrophil M (lecithin) | 0.9903 |
| Centrophase NV (lecithin) | 0.9903 |
| Santone (emulsifier) | 0.3961 |
| Myverol 1804 (emulsifier) | 0.3961 |
| Salt | 13.3663 |
| Vitamin A/B carotene blend | 0.0028 |
| Flavor Tiffany (pure) | 0.0030 |
| Theje (pure) | 0.0074 |
| Maltodextrin 520 | 3.9604 |
| Tricalcium phosphate | 0.99 |
| Total | 100 |

EXAMPLE 2

|  | Garlic & Herb Variant % |
|---|---|
| Kaomel (partially hydrogenated vegetable oil) | 70.4392 |
| Kaorich (partially hydrogenated vegetable oil) | 4.8454 |
| Standard Lecithin | 1.9382 |
| Centrophil M (lecithin) | 0.9693 |
| Centrophase NV (lecithin) | 0.9693 |
| Santone (emulsifier) | 0.3877 |
| Myverol 1804 (emulsifier) | 0.3877 |
| Salt (extra fine) | 13.0826 |
| Vitamin A/B carotene blend | 0.0027 |
| Flavor Tiffany (pure) | 0.0029 |
| Theje (pure) | 0.0073 |
| Maltodextrin 520 | 3.8763 |
| Tricalcium phosphate | 0.9691 |
| Garlic oleoresin flavor | 0.1938 |
| Oregano herbs | 1.9290 |
| Total | 100 |

EXAMPLE 3

|  | Butter flavored variant % |
|---|---|
| CLSP (partially hydrogenated vegetable oil) | 75.0000 |
| Standard Lecithin | 4.0000 |
| Santone (emulsifier) | 0.4000 |
| Myverol 1804 (emulsifier) | 0.4000 |
| Salt | 14.0000 |
| Maltodextrin 520 | 6.1924 |
| Vitamin A/B carotene blend | 0.0027 |
| Flavor Tiffany (pure) | 0.0008 |
| Theje (pure) | 0.0041 |
| Total | 100.0000 |

What is claimed is:

1. An edible particle composition having both a convex and a concave portion, the edible particle composition comprising:

(a) at least about 50.0% to about 95.0% by weight fat;
(b) a taste enhancing agent;
(c) flavor; and
(d) with or without a flow enhancing agent, wherein the edible particle composition has an $N_{20}$ of $\geq 20$, is designed to be poured or shaken out of a dispenser and directly on to food product for consumption, and is suitable to melt on the food products.

2. The edible particle composition according to claim 1 wherein the fat is a mixture of cotton seed oil and soybean oil.

3. The edible particle composition according to claim 1 wherein the composition is substantially free of water.

4. The edible particle composition according to claim 1 wherein the composition comprises up to 20% by weight water.

5. The edible particle composition according to claim 1 wherein the taste enhancing agent is monosodium glutamate, salt or spices.

6. The edible particle composition according to claim 1 wherein the flavor is butter flavor, garlic flavor or butter and garlic flavor.

7. The edible particle composition according to claim 1 wherein the flow enhancing agent is tricalcium phosphate or maltodextrin or both.

8. A package comprising:
(a) a paper or plastic container;
(b) an edible particle composition having both a convex and concave portion, the edible particle composition comprising:
  i) at least about 50.0% to about 95.0% by weight fat;
  ii) a taste enhancing agent;
  iii) flavor; and
  iv) with or without a flow enhancing agent wherein the edible particle composition has an $N_{20}$ of $\geq 20$, does not require refrigeration, is designed to be poured or shaken out of a dispenser and directly on to food products for consumption, and is suitable to melt on the food products.

9. The package according to claim 8 wherein the paper and plastic container have an opening for dispensing the edible particle composition.

10. The package according to claim 8 wherein the fat is a mixture of cotton seed oil and soybean oil.

11. The package according to claim 8 wherein the composition is substantially free of water.

12. The package according to claim 8 wherein the composition comprises up to 20% by weight water.

13. The package according to claim 8 wherein the taste enhancing agent is monosodium glutamate, salt or spices.

14. The package according to claim 8 wherein the flavor is butter flavor, garlic flavor or butter and garlic flavor.

15. The package according to claim 8 wherein the flow enhancing agent is tricalcium phosphate or maltodextrin or both.

16. The package according to claim 8 wherein the package does not need refrigeration.

17. A method for making an edible particle composition comprising the steps of:
(a) melting fat;
(b) adding flavor, taste enhancing agents or both to the melted fat to make a mixture;
(c) cooling the mixture;
(d) shaping a final product particle; and
(e) optionally coating the final product particle with a flow enhancing agent wherein the edible particle composition is from about 50.0% to about 95.0% by weight fat is designed to be poured or shaken out of a dispenser and directly on to food products for consumption, and is suitable to melt on the food products.

18. The method for making an edible particle composition according to claim 17 wherein the final product particle has a concave and a convex portion.

19. The method for making an edible particle composition according to claim 18 wherein the edible particle composition has an $N_{20}$ of $\geq 20$.

* * * * *